(12) United States Patent
Sakuma et al.

(10) Patent No.: US 12,034,122 B2
(45) Date of Patent: Jul. 9, 2024

(54) ELECTROLYTIC SOLUTION FOR LITHIUM-ION SECONDARY BATTERY AND LITHIUM-ION SECONDARY BATTERY

(71) Applicant: MURATA MANUFACTURING CO., LTD., Kyoto (JP)

(72) Inventors: Tomomi Sakuma, Kyoto (JP); Masahiro Miyamoto, Kyoto (JP); Raman Kukreja, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 871 days.

(21) Appl. No.: 17/096,488

(22) Filed: Nov. 12, 2020

(65) Prior Publication Data

US 2021/0066756 A1    Mar. 4, 2021

Related U.S. Application Data

(63) Continuation of application No. PCT/JP2019/020339, filed on May 22, 2019.

(30) Foreign Application Priority Data

May 29, 2018    (JP) .................... 2018-102338

(51) Int. Cl.
*H01M 50/411* (2021.01)
*H01M 4/02* (2006.01)
*H01M 4/485* (2010.01)
*H01M 4/525* (2010.01)
*H01M 4/58* (2010.01)
(Continued)

(52) U.S. Cl.
CPC ....... *H01M 10/0569* (2013.01); *H01M 4/485* (2013.01); *H01M 4/525* (2013.01); *H01M 4/582* (2013.01); *H01M 10/0525* (2013.01); *H01M 50/411* (2021.01); *H01M 2004/027* (2013.01); *H01M 2004/028* (2013.01); *H01M 2300/0037* (2013.01)

(58) Field of Classification Search
CPC .................................................. H01M 10/0569
See application file for complete search history.

(56) References Cited

U.S. PATENT DOCUMENTS

| | | | |
|---|---|---|---|
| 2004/0053122 A1* | 3/2004 | Sugiyama | H01M 50/426 429/144 |
| 2010/0086854 A1* | 4/2010 | Kumar | H01M 4/505 429/231.95 |
| 2014/0162143 A1* | 6/2014 | Watahiki | H01M 10/0569 429/188 |

FOREIGN PATENT DOCUMENTS

| | | |
|---|---|---|
| CN | 102171868 | 8/2011 |
| JP | S60-089075 A | 5/1985 |

(Continued)

OTHER PUBLICATIONS

Japanese Office Action issued Dec. 21, 2021 in corresponding Japanese Application No. 2020-522126.

(Continued)

*Primary Examiner* — Maria Laios
(74) *Attorney, Agent, or Firm* — K&L Gates LLP (57) ABSTRACT

A lithium-ion secondary battery includes a positive electrode, a negative electrode, and an electrolytic solution that includes an alkoxy compound represented by $C_mX_{2m+1}$—O—$(CX_2)_n$—OH. Each X represents hydrogen (H) or a halogen, m is an integer of 1 or greater, n is an integer of 1 or greater, and (m+n) is 4 or greater.

10 Claims, 2 Drawing Sheets

(51) Int. Cl.
_H01M 10/0525_ (2010.01)
_H01M 10/0569_ (2010.01)

(56) References Cited

FOREIGN PATENT DOCUMENTS

| | | | | |
|---|---|---|---|---|
| JP | 2001-118599 | | 4/2001 | |
| JP | 2004-127943 A | | 4/2004 | |
| JP | 2005050585 | * | 2/2005 | ............ Y02E 60/10 |
| JP | 2011-060444 | | 3/2011 | |
| JP | 2011-187163 A | | 9/2011 | |
| JP | 2014-170624 A | | 9/2014 | |
| WO | 2013/015369 A1 | | 1/2013 | |

OTHER PUBLICATIONS

International Search Report mailed Jul. 30, 2019 in connection with PCT/JP2019/020339.
European Office Action issued Jan. 25, 2022 in corresponding European Application No. 19811076.9.
Xu, et al., Strategies for improving the cyclability and thermo-stability of LiMn2O4-based batteries at elevated temperatures, Journal of Materials Chemistry A, 2015, 3, 4092-4123.
1 Chinese Office Action issued Nov. 6, 2023 in corresponding Chinese Application No. 201980029024.0.

* cited by examiner

ELECTROLYTIC SOLUTION FOR LITHIUM-ION SECONDARY BATTERY AND LITHIUM-ION SECONDARY BATTERY

CROSS REFERENCE TO RELATED APPLICATIONS

The present application is a continuation of PCT patent application no. PCT/JP2019/020339, filed on May 22, 2019, which claims priority to Japanese patent application no. JP2018-102338 filed on May 29, 2018, the entire contents of which are being incorporated herein by reference.

BACKGROUND

The present technology generally relates to an electrolytic solution to be used for a lithium-ion secondary battery; and a lithium-ion secondary battery including the electrolytic solution, a positive electrode, and a negative electrode.

Various electronic devices such as mobile phones have been widely used. Such wide spread use has invoked a need for a smaller size, a lighter weight, and a longer life of the electronic devices. To address the need, a lithium-ion secondary battery, which is smaller in size and lighter in weight and allows for a higher energy density, is under development as a power source.

A lithium-ion secondary battery includes a positive electrode, a negative electrode, and an electrolytic solution. A configuration of the electrolytic solution greatly influences battery characteristics. Accordingly, various considerations have been given to the configuration of the electrolytic solution.

Specifically, to improve a characteristic such as a battery life, the electrolytic solution contains an alcohol such as 3-octanol or methoxyethanol.

SUMMARY

The present technology generally relates to an electrolytic solution to be used for a lithium-ion secondary battery; and a lithium-ion secondary battery including the electrolytic solution, a positive electrode, and a negative electrode.

Electronic devices, on which a lithium-ion secondary battery is to be mounted, are increasingly gaining higher performance and more functions, causing more frequent use of the electronic devices and expanding a use environment of the electronic devices. Accordingly, there is still room for improvement in terms of battery characteristics of the lithium-ion secondary battery.

The technology has been made in view of such an issue and it is an object of the technology to provide an electrolytic solution for a lithium-ion secondary battery and a lithium-ion secondary battery that each make it possible to achieve a superior battery characteristic.

According to an embodiment of the present technology, an electrolytic solution for a lithium-ion secondary battery is provided. The electrolytic solution includes an alkoxy compound represented by Formula (1).

$$C_mX_{2m+1}-O-(CX_2)_n-OH \quad (1)$$

(Where:
each X represents hydrogen (H) or a halogen;
m is an integer of 1 or greater;
n is an integer of 1 or greater; and
(m+n) is 4 or greater.)

A lithium-ion secondary battery according to an embodiment of the present technology includes a positive electrode, a negative electrode, and an electrolytic solution. The electrolytic solution has a configuration similar to that of the electrolytic solution for a lithium-ion secondary battery according to an embodiment of the present technology as described above.

According to the electrolytic solution for a lithium-ion secondary battery or the lithium-ion secondary battery of the technology, the electrolytic solution includes the alkoxy compound as described above. This makes it possible to achieve a superior battery characteristic.

It should be understood that effects of the technology are not necessarily limited to those described above and may include any of a series of effects described below in relation to the technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a lithium-ion secondary battery according to an embodiment of the technology. Hereinafter, the lithium-ion secondary battery according to the embodiment of the technology is simply referred to as a "lithium-ion secondary battery".

It should be understood that an electrolytic solution for a lithium-ion secondary battery according to an embodiment of the technology is a part (an element) of the lithium-ion secondary battery described herein. Accordingly, the electrolytic solution is described below together with the lithium-ion secondary battery. Hereinafter, the electrolytic solution for the lithium-ion secondary battery according to the embodiment of the technology is simply referred to as an "electrolytic solution".

The lithium-ion secondary battery obtains a battery capacity by utilizing a lithium insertion phenomenon and a lithium extraction phenomenon, for example. Lithium is an electrode reactant. The battery capacity is, in other words, a capacity of a negative electrode 34 to be described later.

For a series of specific examples described as appropriate below, i.e., a plurality of candidates listed and described in relation to materials, formation methods, etc., only any one of them may be used, or any two or more of them may be used in combination.

Figure 1:
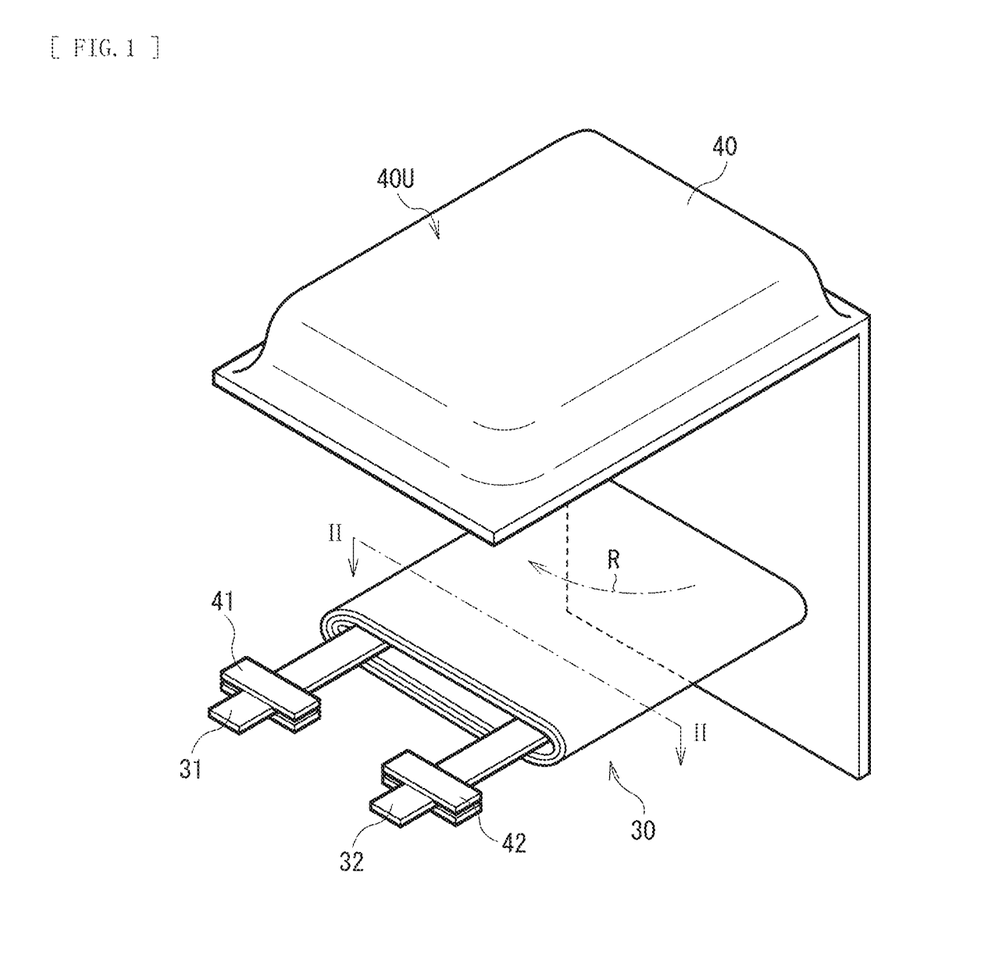
FIG. 1 is a perspective view of a configuration of a lithium-ion secondary battery according to an embodiment of the present technology.
Figure 2:
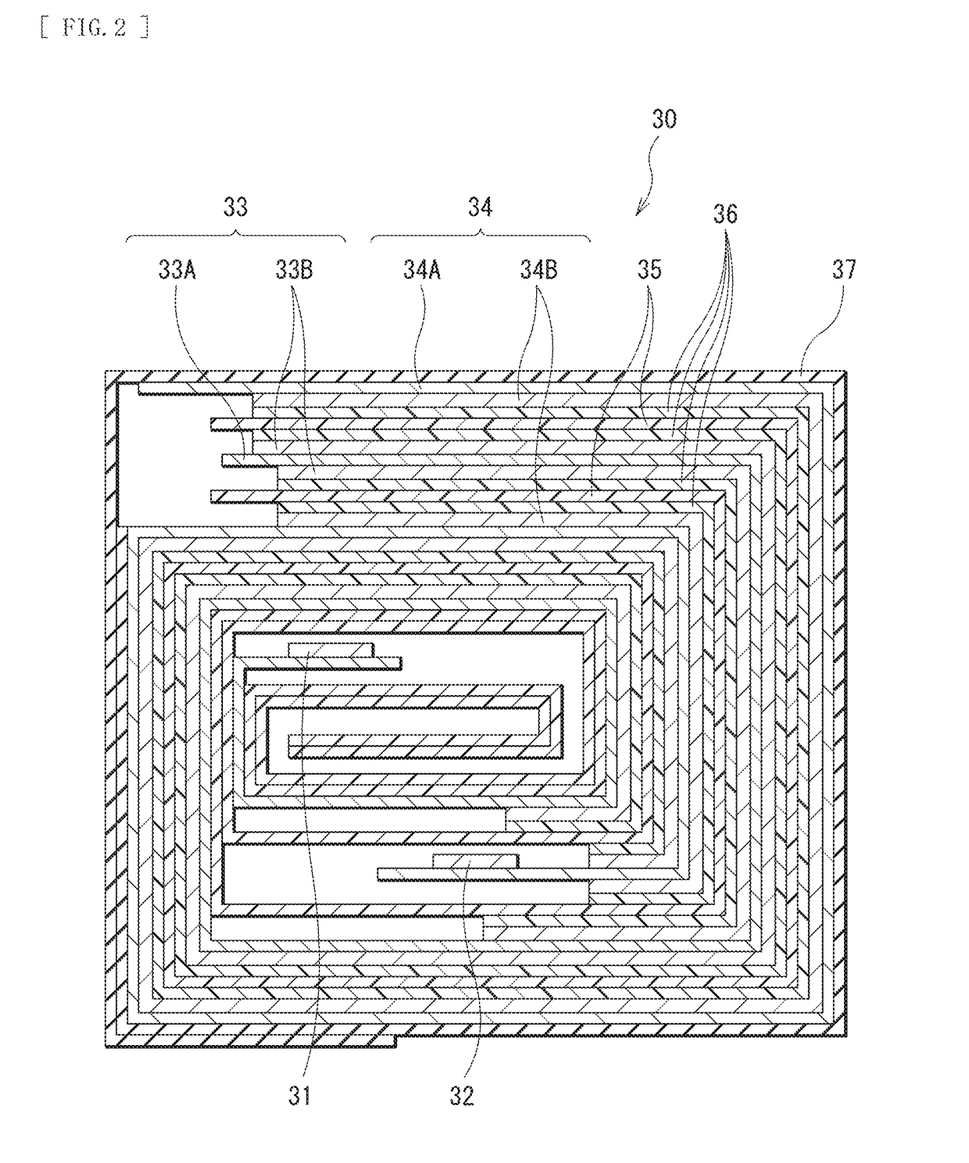
FIG. 2 is a sectional view of a configuration of a main part of the lithium-ion secondary battery illustrated in FIG. 1.

FIG. 1 illustrates a sectional configuration of the lithium-ion secondary battery. FIG. 2 illustrates an enlarged sectional configuration of a main part, that is, a wound electrode body 30, of the lithium-ion secondary battery taken along a line II-II illustrated in FIG. 1. Note that FIG. 1 illustrates a state in which the wound electrode body 30 and an outer package member 40 are separated away from each other.

Referring to FIG. 1, the lithium-ion secondary battery is of a laminated-film type. The lithium-ion secondary battery of the laminated-film type includes, for example, the outer package member 40 having a film shape, and the wound electrode body 30 contained in the outer package member 40. The outer package member 40 has softness or flexibility. The wound electrode body 30 serves as a battery device.

Referring to FIG. 2, the wound electrode body 30 is a structure in which, for example, a positive electrode 33 and the negative electrode 34 are stacked on each other with a separator 35 and an electrolyte layer 36 interposed therebetween, and also in which the stack of the positive electrode 33, the negative electrode 34, the separator 35, and the electrolyte layer 36 is wound. The wound electrode body 30 is protected with a protective tape 37. The electrolyte layer 36 is interposed, for example, between the positive electrode 33 and the separator 35, and also between the negative electrode 34 and the separator 35.

A positive electrode lead 31 is coupled to the positive electrode 33. The positive electrode lead 31 is led out from inside to outside the outer package member 40. The positive electrode lead 31 includes, for example, an electrically conductive material such as aluminum. The positive electrode lead 31 has a shape such as a thin plate shape or a meshed shape, for example.

A negative electrode lead 32 is coupled to the negative electrode 34. The negative electrode lead 32 is led out from inside to outside the outer package member 40. A lead-out direction of the negative electrode lead 32 is, for example, similar to a lead-out direction of the positive electrode lead 31. The negative electrode lead 32 includes, for example, an electrically conductive material such as copper. The negative electrode lead 32 has a shape similar to the shape of the positive electrode lead 31, for example.

The outer package member 40 is, for example, a single film that is foldable in a direction of an arrow R illustrated in FIG. 1. The outer package member 40 includes a portion having a depression 40U, for example. The depression 40U is adopted to contain the wound electrode body 30.

The outer package member 40 is a laminated body or a laminated film including, for example, a fusion-bonding layer, a metal layer, and a surface protective layer that are laminated in this order from an inner side. In a process of manufacturing the lithium-ion secondary battery, for example, the outer package member 40 is folded in such a manner that portions of the fusion-bonding layer oppose each other with the wound electrode body 30 interposed therebetween. Thereafter, outer edges of the fusion-bonding layer are fusion-bonded to each other. The fusion-bonding layer is a film that includes, for example, a polymer compound such as polypropylene. The metal layer is, for example, a metal foil that includes a metal material such as aluminum. The surface protective layer is a film that includes, for example, a polymer compound such as nylon. The outer package member 40 may include, for example, two laminated films that are adhered to each other by means of a material such as an adhesive.

A sealing film 41, for example, is inserted between the outer package member 40 and the positive electrode lead 31. The sealing film 41 is adopted to prevent entry of outside air. The sealing film 41 includes a material having adherence to the positive electrode lead 31. Examples of such a material include a polyolefin resin such as polyethylene.

A sealing film 42, for example, is inserted between the outer package member 40 and the negative electrode lead 32. The sealing film 42 has a function similar to that of the sealing film 41. A material included in the sealing film 42 is similar to the material included in the sealing film 41 except that the material included in the sealing film 42 has adherence to the negative electrode lead 32, not to the positive electrode lead 31.

As illustrated in FIG. 2, the positive electrode 33 includes, for example, a positive electrode current collector 33A, and a positive electrode active material layer 33B provided on the positive electrode current collector 33A. The positive electrode active material layer 33B may be provided, for example, only on one side of the positive electrode current collector 33A, or on each side of the positive electrode current collector 33A. FIG. 2 illustrates a case where the positive electrode active material layer 33B is provided on each side of the positive electrode current collector 33A, for example.

The positive electrode current collector 33A includes, for example, an electrically conductive material such as aluminum.

The positive electrode active material layer 33B includes, as a positive electrode active material, a positive electrode material into which lithium is insertable and from which lithium is extractable. The positive electrode active material layer 33B may further include another material, examples of which include a positive electrode binder and a positive electrode conductor.

The positive electrode material includes a lithium compound, for example. A reason for this is that a high energy density is achievable. The term "lithium compound" is a generic term for a compound that includes lithium as a constituent element. The lithium compound is not limited to a particular kind, and examples thereof include a lithium composite oxide and a lithium phosphate compound.

The term "lithium composite oxide" is a generic term for an oxide that includes, as constituent elements, lithium and one or more of other elements. The lithium composite oxide has any of crystal structures including, without limitation, a layered rock-salt crystal structure and a spinel crystal structure, for example. The term "lithium phosphate compound" is a generic term for a phosphate compound that includes, as constituent elements, lithium and one or more of the other elements. The lithium phosphate compound has a crystal structure such as an olivine crystal structure, for example.

The other elements are elements other than lithium. The other elements are not limited to particular kinds; however, it is preferable that the other elements belong to groups 2 to 15 in the long periodic table of elements, in particular. A reason for this is that a higher voltage is obtainable. Specific examples of the other elements include nickel, cobalt, manganese, and iron.

Examples of the lithium composite oxide having the layered rock-salt crystal structure include $LiNiO_2$, $LiCoO_2$, $LiCo_{0.99}Mg_{0.01}O_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.3302}$, $Li_{1.2}Mn_{0.52}Co_{0.175}Ni_{0.1}O_2$, and $Li_{1.15}(Mn_{0.65}Ni_{0.22}Co_{0.13})O_2$. Examples of the lithium composite oxide having the spinel crystal structure include $LiMn_2O_4$. Examples of the lithium phosphate compound having the olivine crystal structure include $LiFePO_4$, $LiMnPO_4$, $LiFe_{0.5}Mn_{0.5}PO_4$, and $LiFe_{0.3}Mn_{0.7}PO_4$.

It is preferable that the lithium compound be a lithium-fluorine-containing compound, in particular. The term "lithium-fluorine-containing compound" is a generic term for a compound that includes lithium and fluorine as constituent elements.

If the lithium compound is a lithium-fluorine-containing compound, as will be described later, the combined use of the lithium-fluorine-containing compound with an alkoxy compound included in an electrolytic solution makes it easier for a robust film (protective film) derived from the alkoxy compound to be formed with stability on a surface of the positive electrode 33. This helps to prevent decomposition of the electrolytic solution on the surface of the positive electrode 33, thereby making gas generation due to a decomposition reaction of the electrolytic solution less likely to occur. Consequently, the lithium-ion secondary battery is less likely to swell, and an electric resistance of the lithium-ion secondary battery is less likely to increase.

In such a case, even if the lithium-ion secondary battery is stored in a severe environment such as a high-temperature environment, in particular, the decomposition reaction of the electrolytic solution is sufficiently reduced because the stable film is formed on the surface of the positive electrode 33. Further, even if a high end-of-charge voltage is set upon charging of the lithium-ion secondary battery, the stable film is formed on the surface of the positive electrode 33, allowing the decomposition reaction of the electrolytic solution to be sufficiently reduced. The end-of-charge voltage is an upper-limit charge voltage at the time of the charging. Details concerning the high end-of-charge voltage are as follows: a positive electrode potential versus a lithium reference electrode is 4.35 V or higher, and preferably 4.40 V or higher, for example; that is, in a case of using a carbon material such as graphite as the negative electrode active material, the positive electrode potential is 4.30 V or higher, and preferably 4.35 V or higher.

The lithium-fluorine-containing compound is not limited to a particular kind, provided that the lithium-fluorine-containing compound includes lithium and fluorine as constituent elements as described above. Specifically, the lithium-fluorine-containing compound is, for example, a compound (a lithium-fluorine-containing composite oxide) having an average composition represented by Formula (2) below. This lithium-fluorine-containing composite oxide is an oxide that includes lithium, fluorine, cobalt, and one or more other elements (M) as constituent elements. A reason for this is that it becomes easier for the stable film derived from the alkoxy compound to be formed on the surface of the positive electrode 33.

$$Li_wCo_xM_yO_{2-z}F_z \quad (2)$$

(Where:
M is one or more of titanium (Ti), vanadium (V), chromium (Cr), manganese (Mn), iron (Fe), nickel (Ni), copper (Cu), sodium (Na), magnesium (Mg), aluminum (Al), silicon (Si), potassium (K), calcium (Ca), zinc (Zn), gallium (Ga), strontium (Sr), yttrium (Y), zirconium (Zr), niobium (Nb), molybdenum (Mo), barium (Ba), lanthanum (La), and tungsten (W); and
w, x, y, and z satisfy $0.8<w<1.2$, $0.9<x+y<1.1$, $0 \leq y<0.1$, and $0<z<0.05$.)

In particular, it is preferable that the one or more other elements (M) be one or more of elements including titanium, magnesium, aluminum, and zirconium. A reason for this is that it becomes easier for the stable film derived from the alkoxy compound to be formed on the surface of the positive electrode 33.

The lithium-fluorine-containing compound is not limited to a particular kind, provided that the lithium-fluorine-containing compound has a structure represented by Formula (2).

Fluorine included in the positive electrode active material (a lithium-fluorine-containing compound) is obviously the fluorine included in that lithium-fluorine-containing compound as a constituent element. Therefore, the fluorine described here does not refer to fluorine included, as a constituent element, in a component other than the positive electrode active material, nor does it refer to fluorine included in a side reaction product that is newly formed upon use of the lithium-ion secondary battery, i.e., upon charging and discharging of the lithium-ion secondary battery. The former fluorine is, for example but not limited to, fluorine included in an electrolyte salt to be described later, such as lithium hexafluorophosphate. The latter fluorine is, for example but not limited to, fluorine included in a reactant formed upon the charging and the discharging, such as lithium fluoride (LiF).

To confirm whether the positive electrode active material includes fluorine as a constituent element, the positive electrode active material may be analyzed by the following procedure, for example.

First, the lithium-ion secondary battery is disassembled to thereby collect the positive electrode 33, following which the positive electrode active material layers 33B are separated from the positive electrode current collector 33A. Thereafter, the positive electrode active material layers 33B are put into an organic solvent, following which the organic solvent is stirred. The organic solvent may be any organic solvent that allows for dissolution of a soluble component such as the positive electrode binder. This allows the positive electrode active material layers 33B to be separated into an insoluble component such as the positive electrode active material and into the soluble component such as the positive electrode binder. As a result, the positive electrode active material is collected. Lastly, the positive electrode active material is analyzed by an X-ray photoelectron spectroscopy (XPS) to thereby confirm whether the positive electrode active material includes fluorine as a constituent element.

By way of example, if the positive electrode active material (the lithium-fluorine-containing compound) includes, as constituent elements, fluorine and also magnesium as the other element (M), an analysis peak derived from a Mg—F bond is to be detected in the vicinity of binding energy of 306 eV. Accordingly, in a case where such an analysis peak is detected, it is possible to confirm that the positive electrode active material includes fluorine as a constituent element. In contrast, in a case where such an analysis peak is not detected, it is possible to confirm that the positive electrode active material does not include fluorine as a constituent element.

The positive electrode binder includes materials including, without limitation, a synthetic rubber and a polymer compound, for example. Examples of the synthetic rubber include a styrene-butadiene-based rubber. Examples of the polymer compound include polyvinylidene difluoride and polyimide.

The positive electrode conductor includes, for example, an electrically conductive material such as a carbon material. Examples of the carbon material include graphite, carbon black, acetylene black, and Ketjen black. The positive electrode conductor may include a material such as a metal material or an electrically conductive polymer.

As illustrated in FIG. 2, the negative electrode 34 includes, for example, a negative electrode current collector 34A, and a negative electrode active material layer 34B provided on the negative electrode current collector 34A. The negative electrode active material layer 34B may be provided, for example, only on one side of the negative electrode current collector 34A, or on each side of the negative electrode current collector 34A. FIG. 2 illustrates a case where the negative electrode active material layer 34B is provided on each side of the negative electrode current collector 34A, for example.

The negative electrode current collector 34A includes, for example, an electrically conductive material such as copper. It is preferable that the negative electrode current collector 34A have a surface roughened by a method such as electrolysis. A reason for this is that improved adherence of the negative electrode active material layer 34B to the negative electrode current collector 34A is achievable by utilizing a so-called anchor effect.

The negative electrode active material layer 34B includes, as a negative electrode active material, a negative electrode material into which lithium is insertable and from which lithium is extractable. The negative electrode active material layer 34B may further include another material, examples of which include a negative electrode binder and a negative electrode conductor.

To prevent unintentional precipitation of lithium metal on a surface of the negative electrode 34 during charging, it is preferable that a chargeable capacity of the negative electrode material be greater than a discharge capacity of the positive electrode 33. In other words, it is preferable that an electrochemical equivalent of the negative electrode material be greater than an electrochemical equivalent of the positive electrode 33.

The negative electrode material is not limited to a particular kind, and examples thereof include a carbon material and a metal-based material.

The term "carbon material" is a generic term for a material including carbon as a constituent element. A reason for this is that a high energy density is stably obtainable owing to the crystal structure of the carbon material which hardly varies upon insertion and extraction of lithium. Another reason is that improved electrical conductivity of the negative electrode active material layer 34B is achievable owing to the carbon material which also serves as the negative electrode conductor.

Specific examples of the carbon material include graphitizable carbon, non-graphitizable carbon, and graphite. It is preferable that spacing of a (002) plane of the non-graphitizable carbon be greater than or equal to 0.37 nm, and spacing of a (002) plane of the graphite be smaller than or equal to 0.34 nm.

More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is a resultant of firing or carbonizing a polymer compound such as a phenol resin or a furan resin at an appropriate temperature. Other than the above, the carbon material may be low-crystalline carbon heat-treated at a temperature of about 1000° C. or lower, or may be amorphous carbon, for example. The carbon material has a shape such as a fibrous shape, a spherical shape, a granular shape, or a scale-like shape.

The term "metal-based material" is a generic term for a material including one or more of metal elements and metalloid elements as constituent elements. A reason for this is that a high energy density is achievable.

The metal-based material may be a simple substance, an alloy, a compound, a mixture of two or more thereof, or a material including one or more phases thereof. Note that the term "alloy" encompasses not only a material that includes two or more metal elements but also a material that includes one or more metal elements and one or more metalloid elements. The alloy may further include one or more non-metallic elements. The metal-based material has a state such as a solid solution, a eutectic (a eutectic mixture), an intermetallic compound, or a state including two or more thereof that coexist.

The metal element and the metalloid element are each able to form an alloy with lithium. Specific examples of the metal element and the metalloid element include magnesium, boron, aluminum, gallium, indium, silicon, germanium, tin, lead, bismuth, cadmium, silver, zinc, hafnium, zirconium, yttrium, palladium, and platinum.

Among the above-described materials, silicon or tin is preferable, and silicon is more preferable. A reason for this is that a markedly high energy density is obtainable owing to superior lithium insertion capacity and superior lithium extraction capacity thereof.

The metal-based material may specifically be a simple substance of silicon, a silicon alloy, a silicon compound, a simple substance of tin, a tin alloy, a tin compound, a mixture of two or more thereof, or a material including one or more phases thereof. The simple substance described here merely refers to a simple substance in a general sense. The simple substance may therefore include a small amount of impurity, that is, does not necessarily have purity of 100%.

The silicon alloy includes, as a constituent element other than silicon, for example, an element such as tin, nickel, copper, iron, cobalt, manganese, zinc, indium, silver, titanium, germanium, bismuth, antimony, or chromium. The silicon compound includes, as a constituent element other than silicon, for example, an element such as carbon or oxygen. The silicon compound may include, as a constituent element or constituent elements other than silicon, one or more of the series of constituent elements described in relation to the silicon alloy.

Examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ (where $0<v\leq2$), and $LiSiO$. Note, however, that a range of "v" may be $0.2<v<1.4$, in one example.

The tin alloy includes, as a constituent element other than tin, for example, an element such as silicon, nickel, copper, iron, cobalt, manganese, zinc, indium, silver, titanium, germanium, bismuth, antimony, or chromium. The tin compound includes, as a constituent element other than tin, for example, an element such as carbon or oxygen. The tin compound may include, as a constituent element or constituent elements other than tin, one or more of the series of constituent elements described in relation to the tin alloy, for example.

Examples of the tin alloy and the tin compound include $SnO_w$ (where $0<w\leq2$), $SnSiO_3$, $LiSnO$, and $Mg_2Sn$.

In particular, it is preferable that the negative electrode material include both the carbon material and the metal-based material for the following reasons.

The metal-based material, particularly the material including silicon or the like as a constituent element, has an advantage of being high in theoretical capacity, but on the other hand, has an issue of easily expanding and contracting upon charging and discharging. In contrast, the carbon material has an issue of being low in theoretical capacity, but on the other hand, has an advantage of being less likely to expand and contract upon charging and discharging. Accordingly, the combined use of the carbon material and the metal-based material allows for a high theoretical capacity, i.e., a high battery capacity, while reducing expansion and contraction of the negative electrode active material layer 34B upon charging and discharging.

Details of the negative electrode binder are similar to those of the positive electrode binder described above, for example. Details of the negative electrode conductor are similar to those of the negative electrode conductor described above, for example.

A method of forming the negative electrode active material layer 34B is not particularly limited, and examples thereof include a coating method, a vapor-phase method, a liquid-phase method, a spraying method, and a firing (sintering) method. For example, the coating method involves coating the negative electrode current collector 33A with a solution in which a mixture of materials including, without limitation, a particulate or powdered negative electrode active material and the negative electrode binder is dissolved or dispersed in a solvent such as an organic solvent. Examples of the vapor-phase method include a physical deposition method and a chemical deposition method. More specific examples of the vapor-phase method include a vacuum deposition method, a sputtering method, an ion plating method, a laser ablation method, a thermal chemical vapor deposition method, a chemical vapor deposition (CVD) method, and a plasma chemical vapor deposition method. Examples of the liquid-phase method include an electrolytic plating method and an electroless plating method. The spraying method involves spraying a fused or semi-fused negative electrode active material onto the negative electrode current collector 33A. The firing method involves applying a solution onto the negative electrode current collector 33A by the coating method, and thereafter subjecting the applied solution (a coating) to heat treatment at a temperature higher than a melting point of a material such as the negative electrode binder, for example. More specific examples of the firing method include an atmosphere firing method, a reactive firing method, and a hot-press firing method.

The electrolyte layer 36 includes an electrolytic solution and a polymer compound. The electrolyte layer 36 described here is a so-called gel electrolyte. A reason for this is that high ionic conductivity is obtainable and leakage of the electrolytic solution is prevented. The high ionic conductivity is 1 mS/cm or higher at room temperature, for example. The electrolyte layer 36 may further include other materials including, without limitation, various additives.

The electrolytic solution is held by the polymer compound in the electrolyte layer 36. A detailed configuration of the electrolytic solution will be described later.

The polymer compound may be, for example, a homopolymer, a copolymer, or both. Examples of the homopolymer include polyvinylidene difluoride. Examples of the copolymer include a copolymer of vinylidene fluoride and hexafluoropyrene.

Regarding the electrolyte layer 36 which is a gel electrolyte, the concept of a solvent included in the electrolytic solution is broad and encompasses not only a liquid material but also an ion-conductive material that is able to dissociate the electrolyte salt. Accordingly, in a case of using an ion-conductive polymer compound, the polymer compound is also encompassed by the solvent.

It should be understood that the electrolytic solution may be used as it is instead of the electrolyte layer 36. In such a case, the wound electrode body 30 (the positive electrode 33, the negative electrode 34, and the separator 35) is impregnated with the electrolytic solution.

As illustrated in FIG. 2, the separator 35 is interposed between the positive electrode 33 and the negative electrode 34, for example. The separator 35 allows lithium ions to pass therethrough while preventing short circuit resulting from contact of the positive electrode 33 and the negative electrode 34 with each other.

The separator 35 includes a porous film of a material such as a synthetic resin or ceramic, for example. The separator 35 may be a stacked film including two or more porous films that are stacked on each other, in one example. Examples of the synthetic resin include polytetrafluoroethylene, polypropylene, and polyethylene.

In particular, the separator 35 may include the porous film and a polymer compound layer, for example. The porous film serves as a base layer. The polymer compound layer is provided on one side or on each side of the base layer, for example. A reason for this is that adherence of the separator 35 to each of the positive electrode 33 and the negative electrode 34 improves to allow the wound electrode body 30 to be less likely to become distorted. This reduces a decomposition reaction of the electrolytic solution and also reduces leakage of the electrolytic solution with which the base layer is impregnated. Accordingly, even with repetitive charging and discharging, the lithium-ion secondary battery is less likely to increase in resistance, and is also less likely to swell.

The polymer compound layer includes a polymer compound such as polyvinylidene difluoride, for example. A reason for this is that such a polymer compound has superior physical strength and is electrochemically stable. For example, the polymer compound layer may include insulating particles such as inorganic particles. A reason for this is that safety improves. The inorganic particles are not limited to a particular kind, and examples thereof include aluminum oxide and aluminum nitride.

Now, a description is given of a detailed configuration of the electrolytic solution.

The electrolytic solution includes an alkoxy compound represented by Formula (1) below. It is to be noted that only one alkoxy compound may be used or two or more alkoxy compounds may be used.

$$C_mX_{2m+1}-O-(CX_2)_n-OH \qquad (1)$$

(Where:
each X is hydrogen (H) or a halogen;
m is an integer of 1 or greater;
n is an integer of 1 or greater; and
(m+n) is 4 or greater.)

As is apparent from Formula (1), the alkoxy compound is a compound in which an alkoxy group ($C_mX_{2m+1}-O-$) is introduced into an alcohol. As is apparent from the range of m (m≥1), the alkoxy group is a kind of alkoxy group having carbon number of 1 or greater. As is apparent from the range of n (n≥1), the alcohol is a kind of alcohol having carbon number of 1 or greater. Further, as is apparent from a value range ((m+n)≥4) that (m+n) can take, the sum (m+n) of the carbon number (m) of the alkoxy group and the carbon number (n) of the alcohol is 4 or greater.

It should be understood that a position where the alkoxy group is introduced in the alcohol is not particularly limited. The alkoxy group may be introduced to the end of the carbon chain ($-(CX_2)_n-$) of the alcohol, or somewhere else along the carbon chain of the alcohol.

A reason why the electrolytic solution includes the alkoxy compound is that it becomes easier for a robust film derived from the alkoxy compound to be formed with stability on the surface of the positive electrode 21, as compared with a case where the electrolytic solution includes no alkoxy compound and a case where the electrolytic solution includes another compound similar to the alkoxy compound. This helps to prevent decomposition of the electrolytic solution on the surface of the positive electrode 21, thereby making gas generation due to a decomposition reaction of the electrolytic solution less likely to occur.

If the positive electrode 21 (the positive electrode active material) includes a lithium-fluorine-containing compound, in particular, it becomes easier for the robust film derived from the alkoxy compound to be formed as described above with higher stability on the surface of the positive electrode 21. This helps to better prevent decomposition of the electrolytic solution on the surface of the positive electrode 21. Consequently, the lithium-ion secondary battery is further less likely to swell, and an electric resistance of the lithium-ion secondary battery is further less likely to increase.

A possible reason why the combined use of the alkoxy compound and the lithium-fluorine-containing compound makes it easier for the robust film to be formed with higher stability on the surface of the positive electrode 21 is as follows.

If the alkoxy compound and the lithium-fluorine-containing compound are used in combination, a reaction between a hydroxyl group (—OH) in the alkoxy compound and fluorine in the lithium-fluorine-containing compound is facilitated. As a result, the alkoxy compound is more easily decomposed on the positive electrode 21 than on the negative electrode 22, which facilitates film formation of the alkoxy compound on the surface of the positive electrode 21. In such a case, the hydroxyl group in the alkoxy compound reacts preferentially, which causes the alkoxy compound to form a film with the alkoxy group remaining therein. Consequently, the film thus formed is resistant to decomposition even in a severe environment such as in a high temperature environment and under a high charge voltage.

It should be understood that the other compound similar to the alkoxy compound refers to a compound that does not satisfy the respective conditions for m and n described above. Examples of such a compound include 3-octanol and 2-methoxyethanol. 3-Octanol has no alkoxy group and therefore does not correspond to the alkoxy compound described here. 2-Methoxyethanol does not correspond to the alkoxy compound described here, either, because the value of (m+n) is 3.

The alkoxy group ($C_mX_{2m+1}$—O—) is not limited to a particular kind, provided that the alkoxy group has carbon number of 1 or greater as described above. Because each of a plurality (2m+1) of Xs is hydrogen or a halogen as described above, the alkoxy group may be an unhalogenated alkoxy group or a halogenated alkoxy group. In other words, the alkoxy group described here includes both the unhalogenated alkoxy group and the halogenated alkoxy group.

The alkoxy group may be a straight-chain group or a branched group having one or more side chains.

Specific examples of the unhalogenated alkoxy group include a methoxy group, an ethoxy group, a propoxy group, a butoxy group, a pentyloxy group, a hexyloxy group, a heptyloxy group, an octyloxy group, a nonyloxy group, and a decyloxy group.

Although not particularly limited thereto, the halogen may be, for example, fluorine (F), chlorine (Cl), bromine (Br), or iodine (I). A reason for this is that it becomes easier for the stable film derived from the alkoxy compound to be formed on the surface of the positive electrode 21. In a case where each of the plurality of Xs is a halogen, the plurality of halogens may be of the same kind or of kinds different from each other. Needless to say, not all of the plurality of halogens may be of the same kind.

The halogenated alkoxy group is, for example, a group in which one or more, including all, of the hydrogens are substituted by a halogen or halogens regarding each of the series of specific examples of the unhalogenated alkoxy group described above. More specific examples of the halogenated alkoxy group include a perfluoromethoxy group, a perfluoroethoxy group, a perfluoropropoxy group, a perfluorobutoxy group, a perfluoropentyloxy group, a perfluorohexyloxy group, a perfluoroheptyloxy group, a perfluorooctyloxy group, a perfluorononyloxy group, and a perfluorodecyloxy group.

The carbon number of the alkoxy group is not particularly limited provided that the carbon number is 1 or greater; however, the carbon number is preferably 10 or smaller, more preferably 8 or smaller, and still more preferably 6 or smaller, in particular. A reason for this is that the solubility and compatibility of the alkoxy compound are secured.

The alcohol is not limited to a particular kind, provided that the alcohol has carbon number of 1 or greater as described above. Because each of a plurality (2n) of Xs is hydrogen or a halogen as described above, the alcohol may be an unhalogenated alcohol or a halogenated alcohol. In other words, the alcohol described here includes both the unhalogenated alcohol and the halogenated alcohol. Details concerning the kinds of the halogen are as described above.

The carbon chain (—$(CX_2)_n$—) of the alcohol may be straight, or may be branched into one or more side chains.

Specific examples of the unhalogenated alcohol include methanol, ethanol, propanol, butanol, pentanol, hexanol, heptanol, octanol, nonanol, and decanol.

The halogenated alcohol is, for example, a group in which one or more, including all, of the hydrogens are substituted by a halogen or halogens regarding each of the series of specific examples of the unhalogenated alcohol described above. More specific examples of the halogenated alcohol include perfluoromethanol, perfluoroethanol, perfluoropropanol, perfluorobutanol, perfluoropentanol, perfluorohexanol, perfluoroheptanol, perfluorooctanol, perfluorononanol, and perfluorodecanol.

The carbon number of the alcohol is not particularly limited provided that the carbon number is 1 or greater; however, the carbon number is preferably 10 or smaller, more preferably 8 or smaller, and still more preferably 6 or smaller, in particular. A reason for this is that the solubility and compatibility of the alkoxy compound are secured.

The sum (m+n) of the carbon number of the alkoxy group (the value of m) and the carbon number of the alcohol (the value of n) is not particularly limited, provided that the sum is 4 or greater. It is preferable, however, that the sum (m+n) be 11 or smaller. A reason for this is that the solubility and compatibility of the alkoxy compound are secured.

(Specific Examples of Alkoxy Compound)

Here, specific examples of the alkoxy compound are as follows. A series of specific examples of the unhalogenated alkoxy compound is presented for each kind of alcohol below.

In the following, however, the names of alkoxy compounds of the series of specific examples are simplified. Accordingly, the specific examples described below each include not only a straight-chain alkoxy compound but also a branched alkoxy compound.

Specifically, in each of the series of specific examples of the alkoxy compound, as described above, the alkoxy group may be a straight-chain group or a branched group, and the carbon chain of the alcohol may be straight or branched. By way of example, propoxypropanol, which is mentioned as a specific example of the alkoxy compound where n=3, may be a propoxypropanol in which the propoxy group is a straight-chain group, or a propoxypropanol in which the propoxy group is branched. The latter is so-called isopropoxypropanol.

Further, in each of the series of specific examples of the alkoxy compound, as described above, the alkoxy group may be introduced to the end of the carbon chain of the alcohol or somewhere else along the carbon chain of the alcohol. By way of example, methoxypropanol, which is mentioned as a specific example of the alkoxy compound where n=3, may be a methoxypropanol in which the methoxy group is introduced to the end of the carbon chain of propanol, or a methoxypropanol in which the methoxy group is introduced somewhere else along the carbon chain of propanol. The former is so-called 3-methoxypropanol. The latter includes so-called 1-methoxypropanol and so-called 2-methoxypropanol.

In a case where n=1 and therefore the kind of the alcohol is methanol, examples of the alkoxy compound include propoxymethanol, butoxymethanol, pentyloxymethanol, hexyloxymethanol, heptyloxymethanol, octyloxymethanol, nonyloxymethanol, decyloxymethanol, and undecylmethanol.

In a case where n=2 and therefore the kind of the alcohol is ethanol, examples of the alkoxy compound include ethoxyethanol, propoxyethanol, butoxyethanol, pentyloxyethanol, hexyloxyethanol, heptyloxyethanol, octyloxyethanol, nonyloxyethanol, and decyloxyethanol.

In a case where n=3 and therefore the kind of the alcohol is propanol, examples of the alkoxy compound include methoxypropanol, ethoxypropanol, propoxypropanol, butoxypropanol, pentyloxypropanol, hexyloxypropanol, heptyloxypropanol, octyloxypropanol, and nonyloxypropanol.

In a case where n=4 and therefore the kind of the alcohol is butanol, examples of the alkoxy compound include methoxybutanol, ethoxybutanol, propoxybutanol, butoxybutanol, pentyloxybutanol, hexyloxybutanol, heptyloxybutanol, and octyloxybutanol.

In a case where n=5 and therefore the kind of the alcohol is pentanol, examples of the alkoxy compound include methoxypentanol, ethoxypentanol, propoxypentanol, butoxypentanol, pentyloxypentanol, hexyloxypentanol, and heptyloxypentanol.

In a case where n=6 and therefore the kind of the alcohol is hexanol, examples of the alkoxy compound include methoxyhexanol, ethoxyhexanol, propoxyhexanol, butoxyhexanol, pentyloxyhexanol, and hexyloxyhexanol.

In a case where n=7 and therefore the kind of the alcohol is heptanol, examples of the alkoxy compound include methoxyheptanol, ethoxyheptanol, propoxyheptanol, butoxyheptanol, and pentyloxyheptanol.

In a case where n=8 and therefore the kind of the alcohol is octanol, examples of the alkoxy compound include methoxyoctanol, ethoxyoctanol, propoxyoctanol, and butoxyoctanol.

In a case where n=9 and therefore the kind of the alcohol is nonanol, examples of the alkoxy compound include methoxynonanol, ethoxynonanol, and propoxynonanol.

In a case where n=10 and therefore the kind of the alcohol is decanol, examples of the alkoxy compound include methoxydecanol and ethoxydecanol.

The halogenated alkoxy compound is, for example, a group in which one or more, including all, of the hydrogens are substituted by a halogen or halogens regarding each of the series of specific examples of the unhalogenated alkoxy compound described above, and more specifically, for example, a group in which one or more, including all, of the hydrogens are substituted by fluorine regarding each of the series of specific examples.

Although not particularly limited thereto, a content of the alkoxy compound in the electrolytic solution is preferably higher than or equal to 0.001 wt % and lower than or equal to 1 wt %, in particular. A reason for this is that it becomes further easier for the stable film derived from the alkoxy compound to be formed on the surface of the positive electrode 21.

The content of the alkoxy compound in the electrolytic solution is more preferably higher than or equal to 0.01 wt % and lower than or equal to 0.5 wt %, in particular. A reason for this is that it becomes still further easier for the film to be formed on the surface of the positive electrode 21.

The electrolytic solution may include another material in addition to the alkoxy compound described above. Only one other material may be used, or two or more other materials may be used. The other materials are not limited to particular kinds, and examples thereof include a solvent and an electrolyte salt.

(Solvent)

The solvent is a non-aqueous solvent (an organic solvent), for example. The electrolytic solution including the non-aqueous solvent is a so-called non-aqueous electrolytic solution. Only one non-aqueous solvent may be used, or two or more non-aqueous solvents may be used. Note that the foregoing alkoxy compound is excluded from the non-aqueous solvent described here.

The non-aqueous solvent is, for example, a cyclic carbonate ester, a chain carbonate ester, a chain carboxylate ester, a lactone, or a nitrile (mononitrile) compound. A reason for this is that superior characteristics including, without limitation, a superior battery capacity, a superior cyclability characteristic, and a superior storage characteristic are achievable.

Examples of the cyclic carbonate ester include ethylene carbonate, propylene carbonate, and butylene carbonate. Examples of the chain carbonate ester include dimethyl carbonate, diethyl carbonate, ethyl methyl carbonate, and methyl propyl carbonate. Examples of the chain carboxylate ester include methyl acetate, ethyl acetate, methyl propionate, ethyl propionate, propyl propionate, methyl butyrate, methyl isobutyrate, methyl trimethyl acetate, and ethyl trimethyl acetate. Examples of the lactone include γ-butyrolactone and γ-valerolactone. Examples of the nitrile compound include acetonitrile, methoxy acetonitrile, and 3-methoxy propionitrile.

The non-aqueous solvent may also be, for example, 1,2-dimethoxy ethane, tetrahydrofuran, 2-methyl tetrahydrofuran, tetrahydropyran, 1,3-dioxolane, 4-methyl-1,3-dioxolane, 1,4-dioxane, N,N-dimethyl formamide, N-methyl pyrrolidinone, N-methyl oxazolidinone, N,N'-dimethyl imidazolidinone, nitromethane, nitroethane, sulfolane, trimethyl phosphate, or dimethyl sulfoxide. A reason for this is that similar advantages are obtainable.

In particular, it is preferable that the non-aqueous solvent include a cyclic aprotic solvent and a chain aprotic solvent together. A reason for this is that characteristics including, without limitation, a dissociation property of the electrolyte salt and ion mobility improve, and also it becomes further easier for the stable film derived from the alkoxy compound to be formed on the surface of the positive electrode 21. Note that only one cyclic aprotic solvent or two or more cyclic aprotic solvents may be used, and only one chain aprotic solvent or two or more chain aprotic solvents may be used.

Examples of the cyclic aprotic solvent include the cyclic carbonate esters described above. Examples of the chain aprotic solvent include the chain carbonate esters and the chain carboxylate esters described above. For example, the chain aprotic solvents may include only the chain carbonate ester, only the chain carboxylate ester, or both of the chain carbonate ester and the chain carboxylate ester.

In particular, it is preferable that the non-aqueous solvent include one or more of an unsaturated cyclic carbonate ester, a halogenated carbonate ester, a sulfonate ester, an acid anhydride, a multivalent nitrile compound, a diisocyanate compound, and a phosphate ester. A reason for this is that chemical stability of the electrolytic solution improves.

The unsaturated cyclic carbonate ester is a cyclic carbonate ester having one or more carbon-carbon unsaturated bonds (carbon-carbon double bonds). Examples of the unsaturated cyclic carbonate ester include vinylene carbonate (1,3-dioxol-2-one), vinyl ethylene carbonate (4-vinyl-1,3-dioxolane-2-one), and methylene ethylene carbonate (4-methylene-1,3-dioxolane-2-one).

The halogenated carbonate ester is a carbonate ester including one or more halogens as a constituent element. The halogenated carbonate ester may be a cyclic halogenated carbonate ester or a chain halogenated carbonate ester, for example. Examples of the kind of the one or more halogens include, but are not particularly limited to, fluorine, chlorine, bromine, and iodine. Examples of the cyclic halogenated carbonate ester include 4-fluoro-1,3-dioxolane-2-one and 4,5-difluoro-1,3-dioxolane-2-one. Examples of the chain halogenated carbonate ester include fluoromethyl methyl carbonate, bis(fluoromethyl) carbonate, and difluoromethyl methyl carbonate.

Examples of the sulfonate ester include a monosulfonate ester and a disulfonate ester. The monosulfonate ester may be a cyclic monosulfonate ester or a chain monosulfonate ester. The disulfonate ester may be a cyclic disulfonate ester or a chain disulfonate ester. Examples of the cyclic monosulfonate ester include 1,3-propane sultone and 1,3-propene sultone.

Examples of the acid anhydride include carboxylic anhydride, disulfonic anhydride, and carboxylic-sulfonic anhydride. Examples of the carboxylic anhydride include succinic anhydride, glutaric anhydride, and maleic anhydride. Examples of the disulfonic anhydride include ethane disulfonic anhydride and propane disulfonic anhydride. Examples of the carboxylic-sulfonic anhydride include sulfobenzoic anhydride, sulfopropionic anhydride, and sulfobutyric anhydride.

The multivalent nitrile compound is a compound having two or more nitrile groups (—CN). Examples of the multivalent nitrile compound include succinonitrile (NC—$C_2H_4$—CN), glutaronitrile (NC—$C_3H_6$—CN), adiponitrile (NC—$C_4H_8$—CN), sebaconitrile (NC—$C_8H_{10}$—CN), and phthalonitrile (NC—$C_6H_4$—CN).

The diisocyanate compound is a compound having two isocyanate groups (—NCO). Examples of the diisocyanate compound include OCN—$C_6H_{12}$—NCO.

Examples of the phosphate ester include trimethyl phosphate, triethyl phosphate, and triallyl phosphate.

The electrolyte salt is a lithium salt, for example. Only one lithium salt may be used, or two or more lithium salts may be used. The electrolyte salt may include, in addition to the lithium salt, any salt other than the lithium salt, in one example. Examples of the other salt include a salt of light metal other than lithium.

Examples of the lithium salt include lithium hexafluorophosphate ($LiPF_6$), lithium tetrafluoroborate ($LiBF_4$), lithium bis(fluorosulfonyl)imide ($LiN(SO_2F)_2$), lithium bis(trifluoromethane sulfonyl)imide ($LiN(CF_3SO_2)_2$), lithium difluorophosphate ($LiPF_2O_2$), and lithium fluorophosphate ($Li_2PFO_3$).

Alternatively, the lithium salt may be one of respective compounds represented by Formulae (3-1) to (3-6) below, for example. The respective compounds represented by Formulae (3-1), (3-3), (3-4), and (3-6) each include boron (B) as a central element, for example. The respective compounds represented by Formulae (3-2) and (3-5) each include phosphorus (P) as a central element, for example.

[Chem. 1]
Chem. 1

(3-1)

(3-2)

(3-3)

(3-4)

(3-5)

(3-6)

A content of the electrolyte salt is, for example, from 0.3 mol/kg to 3.0 mol/kg both inclusive with respect to the solvent, but is not particularly limited thereto.

The lithium-ion secondary battery operates as follows, for example. Upon charging the lithium-ion secondary battery, lithium ions are extracted from the positive electrode 33, and the extracted lithium ions are inserted into the negative electrode 34 via the electrolyte layer 36. Upon discharging the lithium-ion secondary battery, lithium ions are extracted from the negative electrode 34, and the extracted lithium ions are inserted into the positive electrode 33 via the electrolyte layer 36.

The lithium-ion secondary battery is manufactured by the following procedure, for example. A manufacturing method using the electrolytic solution will be described first and then a manufacturing method using the electrolyte layer 36 will be described.

As described below, fabrication of the positive electrode 33, fabrication of the negative electrode 34, preparation of the electrolytic solution, and assembly of the lithium-ion secondary battery are performed.

First, the positive electrode active material is mixed with materials including, without limitation, the positive electrode binder and the positive electrode conductor on an as-needed basis to thereby obtain a positive electrode mixture. Thereafter, the positive electrode mixture is dispersed into a solvent such as an organic solvent to thereby obtain a paste positive electrode mixture slurry. Lastly, the positive electrode mixture slurry is applied on both sides of the positive electrode current collector 33A, following which the applied positive electrode mixture slurry is dried to thereby form the positive electrode active material layers 33B. As a result, the positive electrode 33 is fabricated. Thereafter, the positive electrode active material layers 33B may be compression-molded by means of a machine such as a roll pressing machine. In this case, the positive electrode active material layers 33B may be heated. The positive electrode active material layers 33B may be compression-molded a plurality of times.

The negative electrode active material layers 34B are formed on both sides of the negative electrode current collector 34A by a procedure similar to the fabrication procedure of the positive electrode 33 described above. Specifically, the negative electrode active material is mixed with materials including, without limitation, the negative electrode binder and the negative electrode conductor on an as-needed basis to thereby obtain a negative electrode mixture. Thereafter, the negative electrode mixture is dispersed into a solvent such as an organic solvent to thereby obtain a paste negative electrode mixture slurry. Thereafter, the negative electrode mixture slurry is applied on both sides of the negative electrode current collector 34A, following which the applied negative electrode mixture slurry is dried to thereby form the negative electrode active material layers 34B. As a result, the negative electrode 34 is fabricated. Thereafter, the negative electrode active material layers 34B may be compression-molded.

The electrolyte salt is added to the solvent, following which the alkoxy compound is added to the solvent. The solvent is thereafter stirred. The electrolytic solution containing the alkoxy compound is thereby prepared.

First, the positive electrode lead 31 is coupled to the positive electrode current collector 33A by a method such as a welding method, and the negative electrode lead 32 is coupled to the negative electrode current collector 34A by a method such as a welding method. Thereafter, the positive electrode 33 and the negative electrode 34 are stacked on each other with the separator 35 interposed therebetween, following which the stack of the positive electrode 33, the negative electrode 34, and the separator 35 is wound to thereby form a wound body. Thereafter, the outer package member 40 is folded in such a manner as to sandwich the wound body, following which the outer edges of the outer package member 40 excluding the outer edge at one piece of the outer package member 40 are bonded to each other by a method such as a thermal fusion bonding method. The wound body is thereby contained in the pouch-shaped outer package member 40. In this case, the sealing film 41 is inserted between the positive electrode lead 31 and the outer package member 40, and the sealing film 42 is inserted between the negative electrode lead 32 and the outer package member 40. Lastly, the electrolytic solution is injected into the pouch-shaped outer package member 40, following which the outer package member 40 is sealed by a method such as a thermal fusion bonding method. This causes the wound body to be impregnated with the electrolytic solution. As a result, the wound electrode body 30 is formed. Thus, the wound electrode body 30 is sealed in the outer package member 40. As a result, the lithium-ion secondary battery using the electrolytic solution is completed.

First, by the procedure described above, the positive electrode 33 and the negative electrode 34 are each fabricated and the electrolytic solution is prepared. Thereafter, materials including, without limitation, the electrolytic solution, the polymer compound, and an organic solvent are mixed to thereby prepare a precursor solution. Thereafter, the precursor solution is applied on the positive electrode 33, following which the applied precursor solution is dried to thereby form the electrolyte layer 36. The precursor solution is also applied on the negative electrode 34, following which the applied precursor solution is dried to thereby form the electrolyte layer 36. Thereafter, by the procedure described above, the positive electrode lead 31 is coupled to the positive electrode current collector 33A, and the negative electrode lead 32 is coupled to the negative electrode current collector 34A. Thereafter, the positive electrode 33 and the negative electrode 34 are stacked on each other with the separator 35 and the electrolyte layers 36 interposed therebetween, following which the stack of the positive electrode 33, the negative electrode 34, the separator 35, and the electrolyte layers 36 is wound to thereby form the wound electrode body 30. Thereafter, the protective tape 37 is attached to a surface of the wound electrode body 30. Lastly, the outer package member 40 is folded in such a manner as to sandwich the wound electrode body 30, following which the outer edges of the outer package member 40 are bonded to each other by a method such as a thermal fusion bonding method. In this case, as described above, the sealing films 41 and 42 are inserted between the positive electrode lead 31 and the outer package member 40 and between the negative electrode lead 32 and the outer package member 40, respectively. The wound electrode body 30 is thereby sealed in the outer package member 40. As a result, the lithium-ion secondary battery using the electrolyte layer 36 is completed.

According to the lithium-ion secondary battery, the electrolytic solution includes the alkoxy compound. In this case, as described above, it is easier for a stable film derived from the alkoxy compound to be formed on the surface of the positive electrode 21 as compared with the case where the electrolytic solution includes no alkoxy compound and the case where the electrolytic solution includes another compound similar to the alkoxy compound. This helps to prevent decomposition of the electrolytic solution on the surface of the positive electrode 21. Accordingly, it is possible to achieve superior battery characteristics.

In particular, the alkoxy compound may include a halogen as a constituent element, and the halogen may be fluorine, for example. This makes it further easier for the stable film derived from the alkoxy compound to be formed on the surface of the positive electrode 21, and makes it possible to achieve higher effects accordingly.

Further, the sum (m+n) of the carbon number of the alkoxy group and the carbon number of the alcohol may be 11 or smaller. This improves characteristics including, without limitation, dissolubility and miscibility of the alkoxy compound, and makes it possible to achieve higher effects accordingly.

Further, the content of the alkoxy compound in the electrolytic solution may be higher than or equal to 0.001 wt % and lower than or equal to 1 wt %. This makes it easier for the film derived from the alkoxy compound to be formed on the surface of the positive electrode 21, and makes it possible to achieve higher effects accordingly.

Further, the electrolytic solution may include the cyclic aprotic solvent and the chain aprotic solvent. This makes it further easier for the stable film derived from the alkoxy compound to be formed on the surface of the positive electrode 21, and makes it possible to achieve higher effects accordingly.

Further, the positive electrode 21 may include the lithium-fluorine-containing compound. In this case, a synergetic action of the lithium-fluorine-containing compound and the alkoxy compound makes it easier for the robust film to be formed with higher stability on the surface of the positive electrode 21, and makes it possible to achieve higher effects accordingly. In this case, the lithium-fluorine-containing compound may be the lithium-fluorine-containing composite oxide represented by Formula (2). This makes it easier for the film to be formed with still higher stability on the surface of the positive electrode 21, and makes it possible to achieve still higher effects accordingly.

Examples of application of the lithium-ion secondary battery are as described below. It is to be noted that applications of the electrolytic solution are similar to those of the lithium-ion secondary battery described here. Accordingly, the applications of the electrolytic solution are described below together with the applications of the lithium-ion secondary battery.

The applications of the lithium-ion secondary battery are not particularly limited as long as they are, for example, machines, devices, instruments, apparatuses, or systems (assembly of a plurality of devices, for example) in which the lithium-ion secondary battery is usable as a driving power source, an electric power storage source for electric power accumulation, or any other source. The lithium-ion secondary battery used as a power source may serve as a main power source or an auxiliary power source. The main power source is preferentially used regardless of the presence of any other power source. The auxiliary power source may be, for example, used in place of the main power source, or may be switched from the main power source on an as-needed basis. In a case where the lithium-ion secondary battery is used as the auxiliary power source, the kind of the main power source is not limited to the lithium-ion secondary battery.

Examples of the applications of the lithium-ion secondary battery include: electronic devices including portable electronic devices; portable life appliances; storage devices; electric power tools; battery packs mountable on laptop personal computers or other devices as a detachable power source; medical electronic devices; electric vehicles; and electric power storage systems. Examples of the electronic devices include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic devices include pacemakers and hearing aids. Examples of the electric vehicles include electric automobiles including hybrid automobiles. Examples of the electric power storage systems include home battery systems for accumulation of electric power for emergency. Needless to say, the lithium-ion secondary battery may have applications other than those described above.

EXAMPLES

A description is given of Examples of the technology below.

Experiment Examples 1-1 to 1-33

The lithium-ion secondary batteries were fabricated and their respective battery characteristics were evaluated as described below.

The laminated lithium-ion secondary batteries illustrated in FIGS. 1 and 2 were each fabricated by the following procedure.

First, 91 parts by mass of the positive electrode active material ($LiCo_{0.99}Mg_{0.01}O_2$ (LCMO)), which is a lithium-containing compound), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby obtain a paste positive electrode mixture slurry. Thereafter, the positive electrode mixture slurry was applied on both sides of the positive electrode current collector 33A (a band-shaped aluminum foil having a thickness of 12 μm) by means of a coating device, following which the applied positive electrode mixture slurry was dried to thereby form the positive electrode active material layers 33B. Lastly, the positive electrode active material layers 33B were compression-molded by means of a roll pressing machine.

First, 95 parts by mass of the negative electrode active material (graphite) and 5 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby obtain a paste negative electrode mixture slurry. Thereafter, the negative electrode mixture slurry was applied on both sides of the negative electrode current collector 34A (a band-shaped copper foil having a thickness of 8 μm) by means of a coating device, following which the applied negative electrode mixture slurry was dried to thereby form the negative electrode active material layers 34B. Lastly, the negative electrode active material layers 34B were compression-molded by means of a roll pressing machine.

The electrolyte salt (lithium hexafluorophosphate ($LiPF_6$)) was added to a solvent, following which the solvent was stirred. Thereafter, the alkoxy compound was added to the solvent, following which the solvent was stirred. As the solvent, ethylene carbonate and propylene carbonate, which are cyclic aprotic solvents, and diethyl carbonate and propyl propionate, which are chain aprotic solvents, were used.

In this case, a mixture ratio (a volume ratio) of ethylene carbonate/propylene carbonate/diethyl carbonate/propyl propionate in the solvent was set to 20:10:30:40, and the content of the electrolyte salt with respect to the solvent was set to 1 mol/kg.

For comparison, electrolytic solutions were prepared without the alkoxy compound, and electrolytic solutions were also prepared using other compounds (3-octanol and 2-methoxyethanol) instead of the alkoxy compound.

The kinds of the alkoxy compound, the contents (wt %) of the alkoxy compound in the electrolytic solution, the kinds of the other compounds, and the contents of the other compounds in the electrolytic solutions were as described in Tables 1 and 2.

First, the positive electrode lead 31 including aluminum was welded to the positive electrode current collector 33A, and the negative electrode lead 32 including copper was welded to the negative electrode current collector 34A. Thereafter, the positive electrode 33 and the negative electrode 34 were stacked on each other with the separator 35 (a fine-porous polyethylene film having a thickness of 9 μm) interposed therebetween to thereby obtain a stacked body. Thereafter, the stacked body was wound in a longitudinal direction, following which the protective tape 37 was attached around the stacked body to thereby form a wound body. Thereafter, the outer package member 40 (including a nylon film having a thickness of 25 μm as a surface protective layer, an aluminum foil having a thickness of 40 μm as a metal layer, and a polypropylene film having a thickness of 30 μm as a fusion-bonding layer) was folded in such a manner as to sandwich the wound body, following which the outer edges of two sides of the outer package member 40 were thermal fusion bonded to each other. In this case, the sealing film 41 (a polypropylene film) was inserted between the positive electrode lead 31 and the outer package member 40, and the sealing film 42 (a polypropylene film) was inserted between the negative electrode lead 32 and the outer package member 40.

Lastly, the electrolytic solution was injected into the outer package member 40 to thereby impregnate the wound body with the electrolytic solution, and thereafter, the outer edges of one of the remaining sides of the outer package member 40 were thermal fusion bonded to each other in a reduced-pressure environment. Thus, the wound electrode body 30 was formed, being sealed in the outer package member 40. As a result, the laminated lithium-ion secondary battery was completed.

Evaluation of battery characteristics (a swelling characteristic and an electric resistance characteristic) of the lithium-ion secondary batteries conducted by the following procedure revealed the results described in Tables 1 and 2.

First, the lithium-ion secondary battery was charged and discharged for one cycle in an ambient temperature environment (at a temperature of 23° C.) in order to stabilize a state of the lithium-ion secondary battery. Thereafter, the lithium-ion secondary battery was charged in the same environment (at a temperature of 23° C.) until a state of charge (SOC) reached 20%, following which a thickness (a pre-storage thickness (mm)) of the charged lithium-ion secondary battery was measured. Thereafter, the lithium-ion secondary battery was charged in the same environment until the state of charge reached 100%. The charged lithium-ion secondary battery was stored (for a storing time of 720 hours) in a high temperature environment (at a temperature of 60° C.), following which the thickness (a post-storage thickness (mm)) of the charged lithium-ion secondary battery was measured. Lastly, a swelling rate (%)=[(post-storage thickness−pre-storage thickness)/pre-storage thickness]×100 was calculated.

Upon the charging, the lithium-ion secondary battery was charged with a constant current of 0.7 C until a voltage reached 4.45 V, and was thereafter charged with a constant voltage of 4.45 V until a current reached 0.05 C. Upon the discharging, the lithium-ion secondary battery was discharged with a constant current of 1 C until the voltage reached 3.0 V. 0.7 C is a value of a current that causes a battery capacity (a theoretical capacity) to be completely discharged in 10/7 hours. Likewise, 0.05 C is a value of a current that causes the battery capacity to be completely discharged in 20 hours, and 1 C is a value of a current that causes the battery capacity to be completely discharged in one hour.

The lithium-ion secondary battery whose state was stabilized by the procedure described above was used. First, electric resistance (pre-storage resistance (Ω)) of the lithium-ion secondary battery in an ambient temperature environment (at a temperature of 23° C.) was measured. Thereafter, the lithium-ion secondary battery was stored (for a storing time of 720 hours) in a high temperature environment (at a temperature of 60° C.), following which the electric resistance (post-storage resistance (Ω)) of the lithium-ion secondary battery was measured. Lastly, a resistance variation rate (%)=(post-storage resistance/pre-storage resistance)×100 was calculated.

TABLE 1

| Experiment example | Alkoxy compound | | Other compound | | Swelling rate (%) | Resistance variation rate (%) |
|---|---|---|---|---|---|---|
| | Kind | Content (wt %) | Kind | Content (wt %) | | |
| 1-1 | Propoxymethanol | 0.05 | — | — | 7.0 | 212 |
| 1-2 | Hexyloxymethanol | 0.05 | — | — | 7.4 | 221 |
| 1-3 | Octyloxymethanol | 0.05 | — | — | 8.7 | 258 |
| 1-4 | Decyloxymethanol | 0.05 | — | — | 9.1 | 266 |
| 1-5 | 2-Ethoxyethanol | 0.05 | — | — | 6.5 | 211 |
| 1-6 | 2-Propoxyethanol | 0.05 | — | — | 6.5 | 258 |
| 1-7 | 1-Methoxypropanol | 0.05 | — | — | 6.9 | 230 |
| 1-8 | 2-Methoxypropanol | 0.05 | — | — | 6.7 | 222 |
| 1-9 | 3-Methoxypropanol | 0.001 | — | — | 15.0 | 248 |
| 1-10 | | 0.01 | | | 7.7 | 217 |
| 1-11 | | 0.02 | | | 7.2 | 215 |
| 1-12 | | 0.03 | | | 6.6 | 211 |
| 1-13 | | 0.05 | | | 6.2 | 210 |
| 1-14 | | 0.07 | | | 6.4 | 212 |
| 1-15 | | 0.1 | | | 6.9 | 215 |
| 1-16 | | 0.15 | | | 7.0 | 221 |
| 1-17 | | 0.2 | | | 7.2 | 236 |
| 1-18 | | 0.5 | | | 7.5 | 251 |
| 1-19 | | 1 | | | 9.5 | 260 |
| 1-20 | | 2 | | | 11.1 | 300 |
| 1-21 | 3-Methoxy-3-fluoropropanol | 0.05 | — | — | 8.1 | 211 |

TABLE 1-continued

| Experiment example | Alkoxy compound Kind | Content (wt %) | Other compound Kind | Content (wt %) | Swelling rate (%) | Resistance variation rate (%) |
|---|---|---|---|---|---|---|
| 1-22 | 3-Ethoxypropanol | 0.05 | — | — | 6.6 | 212 |
| 1-23 | 3-Propoxypropanol | 0.05 | — | — | 7.0 | 217 |
| 1-24 | Isopropoxypropanol | 0.05 | — | — | 7.2 | 280 |

TABLE 2

| Experiment example | Alkoxy compound Kind | Content (wt %) | Other compound Kind | Content (wt %) | Swelling rate (%) | Resistance variation rate (%) |
|---|---|---|---|---|---|---|
| 1-25 | 4-Methoxybutanol | 0.05 | — | — | 6.8 | 215 |
| 1-26 | 4-Ethoxybutanol | 0.05 | — | — | 6.9 | 218 |
| 1-27 | 4-Butoxybutanol | 0.05 | — | — | 8.8 | 257 |
| 1-28 | 6-Methoxyhexanol | 0.05 | — | — | 7.1 | 219 |
| 1-29 | 8-Methoxyoctanol | 0.05 | — | — | 7.7 | 250 |
| 1-30 | 10-Methoxydecanol | 0.05 | — | — | 9.0 | 266 |
| 1-31 | — | — | — | — | 19.9 | 324 |
| 1-32 | — | — | 3-Octanol | 0.05 | 18.8 | 318 |
| 1-33 | — | — | 2-Methoxyethanol | 0.05 | 16.9 | 303 |

As described in Tables 1 and 2, the battery characteristics (the swelling characteristic and the electric resistance characteristic) varied greatly depending on the composition of the electrolytic solution. In the following, the swelling rate and the resistance variation rate in a case where the electrolytic solution included neither the alkoxy compound nor the other compound (Experiment example 1-31) is taken as a comparison reference.

Specifically, in a case where the electrolytic solution included the other compound (Experiment examples 1-32 and 1-33), the swelling rate decreased only slightly, and the resistance variation rate also decreased only slightly. In contrast, in a case where the electrolytic solution included the alkoxy compound (Experiment examples 1-1 to 1-30), the swelling rate decreased markedly and the resistance variation rate also decreased markedly, irrespective of the kind or content of the alkoxy compound.

In a case where the electrolytic solution included the alkoxy compound and also the content of the alkoxy compound was higher than or equal to 0.001 wt % and lower than or equal to 1 wt % (Experiment examples 1-9 to 1-20), the swelling rate and the resistance variation rate each decreased further. In this case, the swelling rate and the resistance variation rate each decreased still further with a content of the alkoxy compound of higher than or equal to 0.01 wt % and lower than or equal to 0.5 wt %.

Experiment Examples 2-1 to 2-4

As described in Table 3, in accordance with a similar procedure except that the composition of the electrolytic solution was changed, the lithium-ion secondary batteries were fabricated and then the battery characteristics (the swelling characteristic and the electric resistance characteristic) thereof were evaluated.

To change the composition of the electrolytic solution, the compound represented by Formula (3-1), that is, LiDFOB, was used as another electrolyte salt. The other electrolyte salt (LiDFOB) was added to the electrolyte salt ($LiPF_6$). The mixture ratio between the electrolyte salt ($LiPF_6$) and the other electrolyte salt (LiDFOB) was as described in Table 3.

Further, to change the composition of the electrolytic solution, 4-fluoro-1,3-dioxolane-2-one (FEC), which is a halogenated carbonate ester, was used as another solvent. The other solvent (FEC) was added to the electrolytic solution. The content of the other solvent (FEC) in the electrolytic solution was as described in Table 3.

TABLE 3

| Experiment example | Alkoxy compound Kind | Content (wt %) | Electrolyte salt Kind | Content (mol/kg) | Halogenated carbonate ester Kind | Content (wt %) | Swelling rate (%) | Resistance variation rate (%) |
|---|---|---|---|---|---|---|---|---|
| 1-5 | 2-Ethoxyethanol | 0.05 | $LiPF_6$ | 1 | — | — | 6.5 | 211 |
| 2-1 | | | $LiPF_6$ + LiDFOB | 0.99 + 0.01 | — | — | 5.8 | 218 |
| 2-2 | | | $LiPF_6$ | 1 | FEC | 0.05 | 7.5 | 198 |

TABLE 3-continued

| | Alkoxy compound | | Electrolyte salt | | Halogenated carbonate ester | | Resistance | |
|---|---|---|---|---|---|---|---|---|
| Experiment example | Kind | Content (wt %) | Kind | Content (mol/kg) | Kind | Content (wt %) | Swelling rate (%) | variation rate (%) |
| 1-13 | 3-Methoxy- | 0.05 | LiPF$_6$ | 1 | — | — | 6.2 | 210 |
| 2-3 | propanol | | LiPF$_6$ + LiDFOB | 0.99 + 0.01 | — | — | 5.3 | 210 |
| 2-4 | | | LiPF$_6$ | 1 | FEC | 0.05 | 7.2 | 190 |

As described in Table 3, in the case where the other electrolyte salt (LiDFOB) was used (Experiment examples 2-1 and 2-3), the swelling rate further decreased while the resistance variation rate remained substantially the same, as compared with those in the cases where the other electrolyte salt was not used (Experiment examples 1-5 and 1-13).

Further, in the case where the other solvent (FEC) was used (Experiment examples 2-2 and 2-4), the swelling rate somewhat increased but remained sufficiently low, and the resistance variation rate decreased further, as compared with those in the cases where the other solvent was not used Experiment Examples 1-5 and 1-13

Experiment Examples 3-1 to 3-3

As described in Table 4, in accordance with a similar procedure except that the kind of the positive electrode active material was changed, the lithium-ion secondary batteries were fabricated and then the battery characteristics (the swelling characteristic and the electric resistance characteristic) thereof were evaluated. As the positive electrode active material, LiCo$_{0.99}$Mg$_{0.01}$O$_{1.99}$F$_{0.01}$ (LCMOF), which is a lithium-fluorine-containing compound (a lithium-fluorine-containing composite oxide), was used.

TABLE 4

| Experiment example | Positive electrode active material | Alkoxy compound | | Resistance | |
|---|---|---|---|---|---|
| | | Kind | Content (wt %) | Swelling rate (%) | variation rate (%) |
| 1-5 | LCMO | 2-Ethoxyethanol | 0.05 | 6.5 | 211 |
| 1-13 | | 3-Methoxypropanol | 0.05 | 6.2 | 210 |
| 1-25 | | 4-Methoxybutanol | 0.05 | 6.8 | 215 |
| 3-1 | LCMOF | 2-Ethoxyethanol | 0.05 | 5.6 | 205 |
| 3-2 | | 3-Methoxypropanol | 0.05 | 5.1 | 201 |
| 3-3 | | 4-Methoxybutanol | 0.05 | 6.1 | 209 |

As described in Table 4, in the case where the lithium-fluorine-containing compound (LCMOF) was used as the positive electrode active material (Experiment examples 3-1 to 3-3), the swelling rate decreased and the resistance variation rate also decreased, as compared with those in the case where the lithium-containing compound (LCMO) was used as the positive electrode active material (Experiment examples 1-5, 1-13, and 1-25).

Based upon the results described in Tables 1 to 4, with the electrolytic solution including the alkoxy compound, the swelling characteristics and the electric resistance characteristics of the lithium-ion secondary batteries improved. Accordingly, superior battery characteristics of the lithium-ion secondary batteries were obtained.

Although the technology has been described above with reference to some embodiments and Examples, embodiments of the technology are not limited to those described with reference to the embodiments and the Examples above and are modifiable in a variety of ways.

Specifically, although the description has been given of the laminated lithium-ion secondary battery, this is non-limiting. For example, the lithium-ion secondary battery may be of any other type such as a cylindrical type, a prismatic type, or a coin type.

Moreover, although the description has been given of the case where the battery device used for the lithium-ion secondary battery has a wound structure, this is non-limiting. For example, the battery device may have any other structure such as a stacked structure.

It is to be understood that the electrolytic solution described above may be used not only for lithium-ion secondary batteries but also for other applications. Examples of such other applications include other electrochemical devices such as capacitors.

The effects described herein are mere examples, and effects of the technology are therefore not limited to those described herein. Accordingly, the technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lithium-ion secondary battery comprising:
a positive electrode;
a negative electrode; and
an electrolytic solution that includes an alkoxy compound represented by Formula (1) below, $$C_mX_{2m+1}\text{—}O\text{—}(CX_2)_n\text{—}OH \tag{1}$$

wherein
each X represents hydrogen (H) or a halogen,
m is an integer of 1 or greater,
n is an integer of 1 or greater, and
(m+n) is 4 or greater, and
wherein a content of the alkoxy compound in the electrolytic solution is from 0.01 percent by weight to 0.2 percent by weight.

2. The lithium-ion secondary battery according to claim 1, wherein the halogen includes any one of fluorine (F), chlorine (Cl), bromine (Br), and iodine (I).

3. The lithium-ion secondary battery according to claim 2, wherein (m+n) is 11 or smaller.

4. The lithium-ion secondary battery according to claim 1, wherein (m+n) is 11 or smaller.

5. The lithium-ion secondary battery according to claim 1, wherein the electrolytic solution further includes a cyclic aprotic solvent and a chain aprotic solvent.

6. The lithium-ion secondary battery according to claim 1 wherein the positive electrode includes a positive electrode active material, and the positive electrode active material includes lithium (Li) and fluorine (F).

7. The lithium-ion secondary battery according to claim 6, wherein the positive electrode active material includes a compound represented by Formula (2) below, $$Li_wCo_xM_yO_{2-z}F_z \quad (2)$$

wherein

M represents one or more of titanium (Ti), vanadium (V), chromium (Cr), manganese (Mn), iron (Fe), nickel (Ni), copper (Cu), sodium (Na), magnesium (Mg), aluminum (Al), silicon (Si), potassium (K), calcium (Ca), zinc (Zn), gallium (Ga), strontium (Sr), yttrium (Y), zirconium (Zr), niobium (Nb), molybdenum (Mo), barium (Ba), lanthanum (La), and tungsten (W), and W, x, y, and z satisfy $0.8<w<1.2, 0.9<x+y<1.1, 0\leq y<0.1$, and $0<z<0.05$.

8. The lithium-ion secondary battery according to claim 1, further comprising a separator provided between the positive electrode and the negative electrode.

9. The lithium-ion secondary battery according to claim 8, wherein the separator includes at least one of a porous film and a polymer compound layer.

10. An electrolytic solution for a lithium-ion secondary battery, the electrolytic solution comprising an alkoxy compound represented by Formula (1) below, $$C_mX_{2m+1}\text{—}O\text{—}(CX_2)_n\text{—}OH \quad (1)$$

wherein each X represents hydrogen (H) or a halogen, m is an integer of 1 or greater, n is an integer of 1 or greater, and (m+n) is 4 or greater, and wherein a content of the alkoxy compound in the electrolytic solution is from 0.01 percent by weight to 0.2 percent by weight.

* * * * *